United States Patent [19]

Reynaldos

[11] Patent Number: 4,758,043

[45] Date of Patent: Jul. 19, 1988

[54] FLAP FOR VEHICLE WINDOWS

[76] Inventor: Ricardo E. Reynaldos, 261 NW. 39 Ave., Miami, Fla. 33126

[21] Appl. No.: 40,810

[22] Filed: Apr. 21, 1987

[51] Int. Cl.⁴ .............................................. B60J 9/00
[52] U.S. Cl. ................................................... 296/153
[58] Field of Search ......................... 296/153; 280/770

[56] References Cited

U.S. PATENT DOCUMENTS

| | | | |
|---|---|---|---|
| 2,789,862 | 4/1957 | Boyer | 296/153 |
| 2,803,493 | 8/1957 | Haefliger | 296/153 |
| 2,877,049 | 3/1959 | Lucas | 296/153 |

Primary Examiner—Robert R. Song

Attorney, Agent, or Firm—Jay Sanchelima

[57] ABSTRACT

Flap for vehicle windows comprising flexible internal and external sheets that sandwich a cushion member. Three portions or sections are defined, namely, an external end section, a middle section and an internal section. The middle section mounts over a conventional window opening and it has the cushion member. A magnetic member is mounted to the underside of the external lowermost end of the external section and it is intended to removably secure the external section against the vehicle. Adhesive means are provided to removably secure the internal section to the interior of the vehicle's door.

6 Claims, 2 Drawing Sheets

FLAP FOR VEHICLE WINDOWS

BACKGROUND OF THE INVENTION

1. Field of the Invention

The present invention relates to protectors for vehicle windows, and more particularly, to such protectors that are removably mounted and have the general shape of a flap.

2. Description of the Related Art

It is quite common to see passengers in motor vehicles resting their elbows on the sill of the window and, not infrequently, their arms sweat causing decoloration of the interior and exterior of the vehicle. Also, sometimes the glass of the window bites or pinches the passenger's arm.

Applicant believes that the closest reference corresponds to U.S. Pat. No. 4,399,347 issued to Schmitt. However, it differs from the present invention because it is attached to motor vehicle windows to prevent fogging or icing and it does not removably mount over the window sill in a vehicle.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a flap for vehicle windows that can be readily and removably installed to any window of any vehicle.

It is another object of this present invention to provide such a flap that will stay securely in place once installed and that provides a padded resting area for the passenger using it.

It is yet another object of this invention to provide such a flap that is attractive and capable of carrying advertisements on its visible surfaces.

It is yet another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
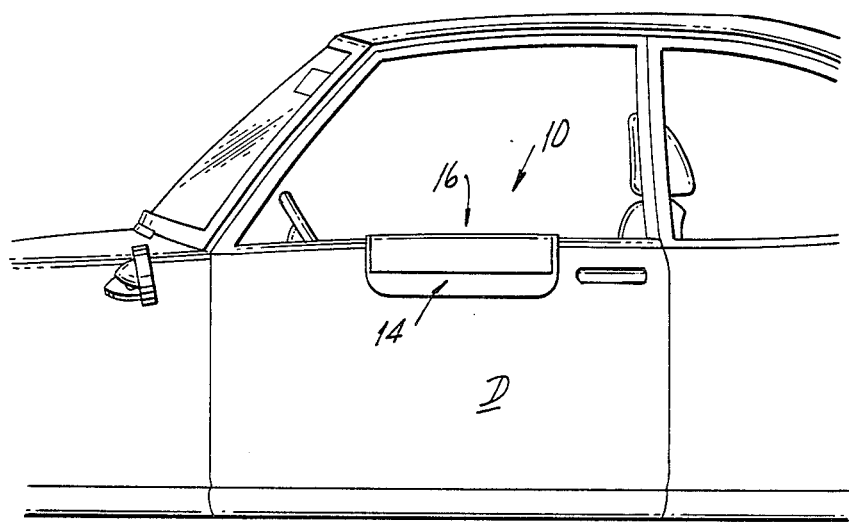
FIG. 1 represents a side view of a section of an automobile where the flap protector has been mounted.

Referring now to FIG. 1, where the present invention is generally referred to with numeral 10, it can be observed that it folds over the vehicle's door D, at the base of the window. The external section 14 includes a flat magnetic member 60 (shown in FIG. 4) at the underside of its lowermost end. On the upper surface of section 14, it is possible to have messages or advertisements. Middle portion or section 16 provides sufficient area to cover the opening of the window glass, and preferably, it is padded to make a comfortable armrest.

Figure 2:
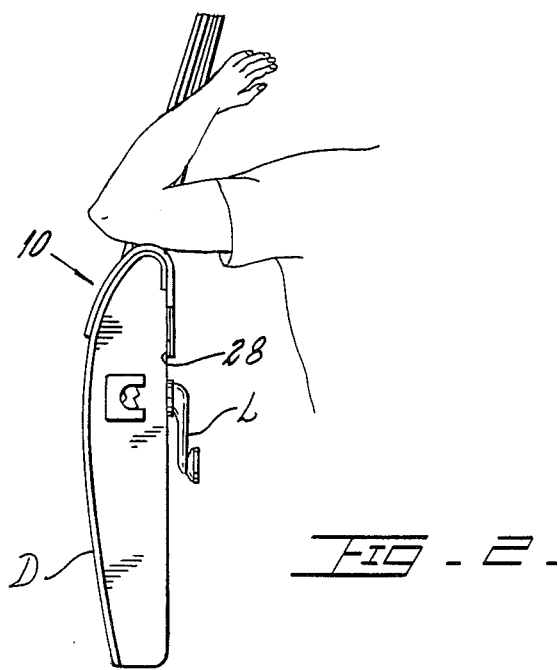
FIG. 2 shows the flap protector from the back and a user's elbow over it.
Figure 3:
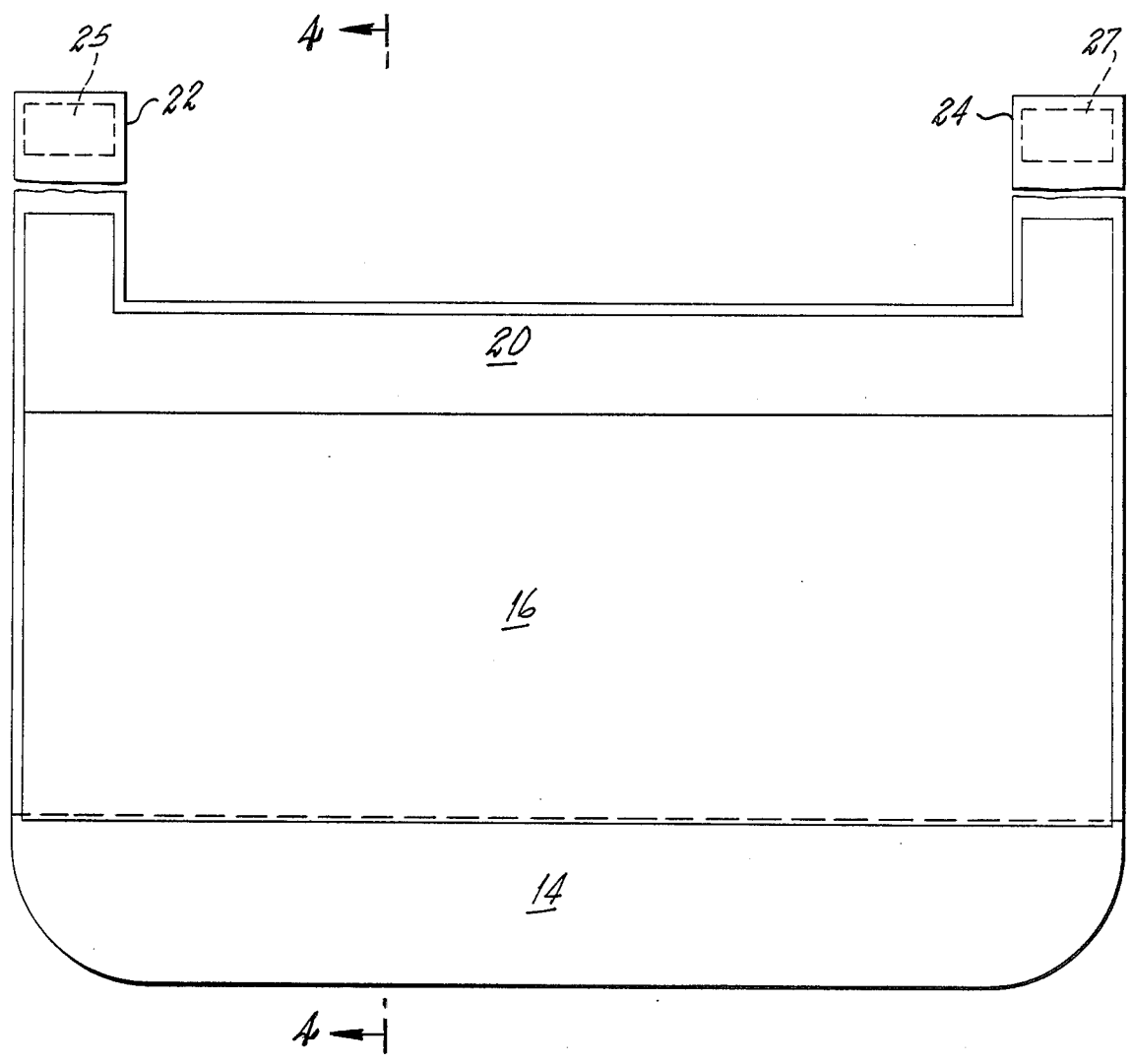
FIG. 3 illustrates a partially broken top view of the present invention.

Internal portion or section 20, which is adjacent to the middle section 16, extends downwardly with legs 22 and 24 so that the window lever L, and/or other devices conventionally found in vehicles are cleared. The ends of legs 22 and 24 include self-adhering (i.e., Velcro) pads 25 and 27 of one type (i.e., male or bristle) and the complementing other type (female or loops) of a self-adhering pad is found in pad 28 (only one shown in FIG. 2) affixed to the interior wall of the vehicle's door.

Figure 4:
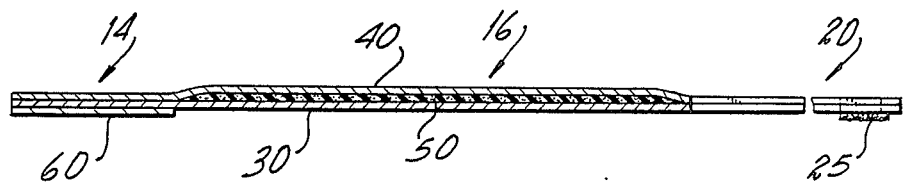
FIG. 4 is a representation of a cross-sectional view taken along line 4—4 in FIG. 3.

In the preferred embodiment shown, refer to FIG. 4, flexible internal and external sheets 30 and 40 sandwich a foam member 50 that provides sufficient cushion to a user as an armrest. Sheets 30 and 40 are, preferably, sewn together or affixed together through conventional means, such as thermoforming means. Magnetic element 60 is, preferably, glued to internal sheet 30 on the underside of section 14. Magnetic element 60 is preferably a relatively flexible material since a metallic magnet would scratch the exterior of the vehicle. Magnetic element 60 attracts interior portion 20 towards the vehicle.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A flap for vehicle windows having a sill opening, comprising:
   A. a first flexible sheet having sufficient dimensions to substantially cover said opening, said sheet having an external portion that extends outwardly sufficiently to allow space for a legend, a middle portion covering said opening and an internal portion that extends inwardly and said internal portion includes at least one leg;
   B. magnetic means mounted to said external portion so that said external portion is attracted towards said vehicle and said magnetic means being made out of a flexible material;
   C. adhesive means for removably mounting said internal portion to the interior of said vehicle;
   D. cushion means mounted on said middle portion thereby providing a soft armrest area; and
   E. a second flexible sheet having substantially the same dimensions as said first sheet and being firmly secured thereto so that said cushion means is totally covered by said first and second sheets.

2. The flap set forth in claim 1 wherein said internal portion which includes at least one leg.

3. The flap set forth in claim 2 wherein said adhesive means are mounted at the end of said leg.

4. The flap set forth in claim 3 wherein said adhesive means includes self adhesive pads mounted to said internal portion.

5. The flap set forth in claim 1 wherein said internal portion includes two legs and said adhesive means are mounted at the end of said legs.

6. The flap forth in claim 5 wherein said adhesive means includes pads having male type self adhesive.

* * * * *